United States Patent
Toyama et al.

(10) Patent No.: US 7,435,779 B2
(45) Date of Patent: Oct. 14, 2008

(54) PRESSURE SENSITIVE ADHESIVES FOR OPTICAL FILM, MANUFACTURING METHODS FOR PRESSURE SENSITIVE ADHESIVE LAYER FOR OPTICAL FILM, PRESSURE SENSITIVE ADHESIVE LAYERS FOR OPTICAL FILM, PRESSURE SENSITIVE ADHESION TYPE OPTICAL FILMS AND IMAGE DISPLAYS

(75) Inventors: Yuusuke Toyama, Ibaraki (JP); Masayuki Satake, Ibaraki (JP); Akiko Ogasawara, Ibaraki (JP); Yutaka Moroishi, Ibaraki (JP); Fumiko Nakano, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 337 days.

(21) Appl. No.: 11/290,165

(22) Filed: Nov. 30, 2005

(65) Prior Publication Data

US 2006/0121273 A1 Jun. 8, 2006

(30) Foreign Application Priority Data

Dec. 2, 2004 (JP) ............................. 2004-349585
May 26, 2005 (JP) ............................. 2005-153972

(51) Int. Cl.
*C08L 33/14* (2006.01)
*C09J 133/14* (2006.01)
*C09K 19/38* (2006.01)

(52) U.S. Cl. ..................... 525/127; 428/1.5; 525/123
(58) Field of Classification Search .................. None
See application file for complete search history.

(56) References Cited

U.S. PATENT DOCUMENTS

| 6,310,612 B1 | 10/2001 | Kotsubo et al. | |
| 2002/0037413 A1* | 3/2002 | Kishioka et al. | 428/412 |
| 2005/0014879 A1* | 1/2005 | Moroishi et al. | 524/261 |

FOREIGN PATENT DOCUMENTS

| JP | 8-199131 | | 8/1996 |
| JP | 8-199131 A | * | 8/1996 |
| JP | 08-216317 | | 8/1996 |
| JP | 08-216319 | | 8/1996 |
| JP | 9-84593 | | 3/1997 |
| JP | 09-159821 | | 6/1997 |
| JP | 09-159823 | | 6/1997 |
| JP | 9-292518 A | * | 11/1997 |
| JP | 10-279907 | | 10/1998 |
| JP | 11-181385 | | 7/1999 |
| JP | 2001-026759 | | 1/2001 |
| JP | 2002-107507 | | 4/2002 |
| JP | 2002-241708 A | | 8/2002 |
| JP | 2003-013027 | | 1/2003 |
| JP | 2003-41229 A | * | 2/2003 |
| JP | 2003-49141 A | | 2/2003 |
| JP | 2003-49141 A | * | 2/2003 |

* cited by examiner

*Primary Examiner*—Robert Sellers
(74) *Attorney, Agent, or Firm*—Knobbe Martens Olson & Bear LLP

(57) ABSTRACT

It is an object of the invention to provide a pressure sensitive adhesive for an optical film with which a pressure sensitive adhesive type optical film capable of suppressing bowing and light leakage caused by a stress accompanying a dimensional change of members such as an optical film, high in durability, excellent in handling ability in an aspect of a fabrication process thereof and good in quality can be obtained. There is provided a pressure sensitive adhesive for an optical film comprising: 100 parts by weight of a (meth)acrylic-based polymer (A) including an alkyl (meth)acrylate (a1) and a (meth)acrylic-based monomer containing a hydroxyl group (a2), as a copolymerizable component, in content in the range of from 0.01 to 5 parts by weight relative to 100 parts by weight of the alkyl (meth)acrylate (a1); 0.02 to 2 parts by weight of a peroxide (B); and 0.001 to 2 parts by weight of an isocyanate-based compound (C), the contents of the peroxide (B) and the isocyanate-based compound (C) being values relative to 100 parts by weight of the (meth)acrylic-based polymer (A).

8 Claims, No Drawings

PRESSURE SENSITIVE ADHESIVES FOR OPTICAL FILM, MANUFACTURING METHODS FOR PRESSURE SENSITIVE ADHESIVE LAYER FOR OPTICAL FILM, PRESSURE SENSITIVE ADHESIVE LAYERS FOR OPTICAL FILM, PRESSURE SENSITIVE ADHESION TYPE OPTICAL FILMS AND IMAGE DISPLAYS

BACKGROUND OF THE INVENTION

1. Field of the Invention

The invention relates to a pressure sensitive adhesive for an optical film. The invention further relates to a manufacturing method for a pressure sensitive adhesive layer for an optical film using the pressure sensitive adhesive for an optical film and a pressure sensitive adhesive for an optical film obtained by the manufacturing method. The invention still further relates to a pressure sensitive adhesion type optical film at least one surface of which the pressure sensitive adhesive layer for an optical film is laminated. The invention still further relates to an image display such as a liquid crystal display, an organic electro-luminescent (EL) display, Plasma Display Panel (PDP) and the like using the pressure sensitive adhesion type optical film. Examples of the optical film include: a polarizing plate, a retardation plate, an optical compensation film, a brightness enhancement film and a laminate thereof.

2. Description of the Related Art

A liquid crystal display indispensably requires polarizing elements disposed on both sides of a liquid crystal cell because of an image forming method adopted therein and generally polarizing plates are adhered. Besides, on a liquid crystal panel, various kinds of optical elements have been used in addition to a polarizing plate in order to improve a display quality of a display. For example, there have been used a retardation plate for coloration prevention, a viewing angle increasing film for improving a viewing angle of a liquid crystal display and a brightness enhancement film for raising a contrast of a display. The films each are collectively referred to an optical film.

A pressure sensitive adhesive is usually employed in adhering an optical film described above to a liquid crystal cell. An optical film and a liquid crystal cell or optical films are usually adhered to each other using a pressure sensitive adhesive therebetween in order to reduce a light loss. In such cases, a pressure sensitive adhesion type optical film in which a pressure sensitive adhesive is provided in advance on one surface of an optical film as a pressure sensitive adhesive layer is generally used because of a merit such as that no necessity arises for a drying step of fix the optical film.

An optical film described above is easy to contract or expand in conditions such as heating or humidifying; therefore, after the optical film is adhered to a liquid crystal panel, film lifting or peeling off occurs with ease. In applications of vehicle installation such as car navigation and a large size television, for which a high durability is required, a necessity arises for a pressure sensitive adhesive with difficulty for causing film lifting or peeling off. Moreover, in some case, inconvenient phenomena occur that a liquid crystal cell is bowed due to contraction or expansion of an optical film, as described above, and light leaks in the peripheral area of a liquid crystal panel generated by a residual stress in the optical film proper. In order to eliminate the phenomena, a proposal has been offered on a pressure sensitive adhesive composition containing a component of a plasticizer or an oligomer as a pressure sensitive adhesive for an optical film (JP-A Nos. 9-84593 and 10-279907).

On the other hand, a pressure sensitive adhesion type optical film described above is punched or slit into pieces with a predetermined size, in which working possibilities arise that a pressure sensitive adhesive is taken away by a cutting blade or a pressure sensitive adhesive is swelled out from a cutting surface. An unfavorable possibility is expected that a pressure sensitive adhesive is taken away from or contaminates a punched optical film during visual inspection or transport of the punched optical film. It is an important issue to improve handling ability in an aspect of fabrication process of an optical film in addition to prevention of the peeling off and bowing and light leakage, whereas improvement on the issue cannot be expected with use of a pressure sensitive adhesive composition containing a component of a plasticizer or an oligomer.

An acrylic-based pressure sensitive adhesive is generally used as a pressure sensitive adhesive for an optical film from the standpoint of transparency and durability. The acrylic-based pressure sensitive adhesive is generally cross-linking treated. Cross-linking agents used in an acrylic-based pressure sensitive adhesive for an optical film that are known include: for example, an isocyanate compound, an epoxy compound, a glycidyl compound and a metal chelate (JP-A Nos. 8-199131 and 2003-49141).

SUMMARY OF THE INVENTION

It is an object of the invention to provide a pressure sensitive adhesive for an optical film with which a pressure sensitive adhesive type optical film capable of suppressing bowing and light leakage caused by a stress accompanying a dimensional change of members such as an optical film, high in durability, excellent in handling ability in an aspect of a fabrication process thereof and good in quality can be obtained. It is another object of the invention to provide a manufacturing method for a pressure sensitive adhesive layer for an optical film using the pressure sensitive adhesive for an optical film and it is still another object of the invention to provide an pressure sensitive adhesive layer for an optical film obtained by means of the manufacturing method.

It is yet another object of the invention to provide a pressure sensitive adhesion type optical film in which the pressure sensitive adhesive layer for an optical film is laminated on at least one surface of an optical film. It is a further object of the invention to provide an image display using the pressure sensitive adhesion type optical film.

The inventors have been conducted serious studies in order to solve the problems and as a result, they found the pressure sensitive adhesive for an optical film described below, which has led to completion of the invention.

Thus, the invention is directed to a pressure sensitive adhesive for an optical film comprising: 100 parts by weight of a (meth)acrylic-based polymer (A) including an alkyl (meth)acrylate (a1) and a (meth)acrylic-based monomer containing a hydroxyl group (a2), as a copolymerizable component, in content in the range of from 0.01 to 5 parts by weight relative to 100 parts by weight of the alkyl (meth)acrylate (a1); 0.02 to 2 parts by weight of a peroxide (B); and 0.001 to 2 parts by weight of an isocyanate-based compound (C), the contents of the peroxide (B) and the isocyanate-based compound (C) being values relative to 100 parts by weight of the (meth) acrylic-based polymer (A).

A pressure sensitive adhesive for an optical film of the invention is a pressure sensitive adhesive composition, constituted of a (meth) acrylic-based polymer (A) containing an alkyl (meth)acrylate (a1) as a main component and a (meth) acrylic-based monomer containing a hydroxyl group (a2), into which polymer (A) a predetermined quantity of a peroxide (B) and a predetermined quantity of an isocyanate-based compound (C) are mixed. With such a composition adopted, a cross-linking method using a thermal decomposition cross-linking reaction caused by the peroxide (B) and a cross-linking method using a urethane bond formed between the isocyanate-based compound (C) and a hydroxyl group owned by the monomer (a2) are simultaneously used, thereby enabling not only excellency in durability to be held while a sufficient stress relaxation characteristic is retained, but also excellency in handlability in an aspect of a manufacturing process thereof to be sustained. The pressure sensitive adhesive for an optical film preferably further contains a silane coupling agent.

The invention is also directed to a manufacturing method for a pressure sensitive adhesive layer for an optical film in which the pressure sensitive adhesive layer is formed by causing a cross-linking reaction in a pressure sensitive adhesive for an optical film.

The invention is also directed to a pressure sensitive adhesive layer for an optical film constituted of a pressure sensitive adhesive layer formed by means of the manufacturing method.

The invention is also directed to a pressure sensitive adhesion type optical film in which a pressure sensitive adhesive layer for an optical film is laminated on at least one surface of the optical film.

In the present invention, the pressure sensitive adhesive layer which is laminated on an optical film with an anchor coat layer inserted between can be used as the abovementioned pressure sensitive adhesive layer. In addition, the anchor coat layer which contains a polymer is preferably used.

Adherence between an optical film and a pressure sensitive adhesive layer can be satisfied by controlling a quantity of use of an isocyanate-based compound (C) in the above range and further enhanced by providing an anchor coat layer.

In addition, in the pressure sensitive adhesion type optical film, it is preferable that adherence between an optical film and a pressure sensitive adhesive layer is 10 N/25 mm or more in a 90 degree peel test. With the adhering strength of 10N/25 mm or more, it can be determined that the adherence is satisfied. The adhering strength is preferably 12N/25 mm or more and more preferably 15N/25 mm or more.

Furthermore, the invention is also directed to an image display using at least one sheet of a pressure sensitive adhesion type optical film. In the present invention, these pressure sensitive adhesion type optical films may be used alone, or two or more kinds may be used in combination, according to aspects of use of image displays such as liquid crystal displays.

DESCRIPTION OF THE PREFERRED EMBODIMENTS

A pressure sensitive adhesive for an optical film of the invention is an acrylic-based pressure sensitive adhesive and a pressure sensitive adhesion type optical film of the invention is obtained by laminating a pressure sensitive adhesive layer made of the acrylic-based pressure sensitive adhesive on at least one surface of an optical film. An anchor coat layer may be inserted between an optical film and the pressure sensitive adhesive layer. Note that the pressure sensitive adhesive layer may be provided on either one surface or both surfaces of an optical film.

An acrylic-based pressure sensitive adhesive contains a (meth)acrylic-based polymer (A), as a base polymer, including 100 parts by weight of an alkyl (meth)acrylate (a1); and 0.01 to 5 parts by weight of a (meth)acrylic-based monomer containing a hydroxyl group (a2), as a copolymerizable component, relative to 100 parts by weight of the alkyl (meth) acrylate (a1). Note that (meth)acrylate means acrylate and/or methacrylate and the (meth) in the invention has the same in meaning.

An alkyl group of an alkyl (meth)acrylate (a1) that is the main skeleton of a (meth)acrylic-based polymer (A) has about 1 to 18 carbon atoms and preferably about 1 to 9 carbon atoms, and concrete examples of alkyl (meth)acrylates include: methyl(meth)acrylate; ethyl(meth)acrylate; propyl (meth)acrylate; n-butyl(meth)acrylate; iso-butyl(meth)acrylate; 2-ethylhexyl(meth)acrylate; n-octyl(meth)acrylate; iso-octyl(meth)acrylate; lauryl(meth)acrylate; isononyl(meth) acrylate; stearyl(meth)acrylate; cyclohexyl(meth)acrylate; and the like. They can be used either alone or in combination. The alkyl groups thereof preferably have 3 to 9 carbon atoms on average.

Concrete examples of (meth)acrylic-based monomers containing a hydroxyl group (a2) include: 2-hydroxyethyl (meth) acrylate; 2-hydroxypropyl (meth)acrylate; 4-hydroxybutyl (meth)acrylate; 6-hydroxyhexyl (meth)acrylate; 8-hydroxy-octyl (meth)acrylate; 10-hydroxydecyl (meth)acrylate; 12-hydroxylauryl (meth)acrylate; (4-hydroxymethylcyclo-hexyl)-methyl acrylate; and the like. They can be used either alone or in combination.

A (meth)acrylic-based monomer containing a hydroxyl group (a2) preferably has the alkylen chain of a hydroxyalkyl of a hydroxyalkyl thereof having 4 or more carbon atoms because of high reactivity with an isocyanate-based compound (C). In a case where the alkylen chain of a hydroxy-alkyl of a hydroxyalkyl group thereof having 4 or more carbon atoms is used as a (meth)acrylic-based monomer containing a hydroxyl group (a2), the alkyl group of an alkyl (meth)acrylate (a1) preferably has the number of carbon atoms equal to or less than the number of carbon atoms owned by the alkylen chain of a hydroxyalkyl of the hydroxyalkyl of a (meth)acrylic-based monomer containing a hydroxyl group (a2). For example, in a case where 4-hydroxybutyl (meth) acrylate is used as a (meth)acrylic-based monomer containing a hydroxyl group (a2), the alkyl group of an alkyl (meth) acrylate (a1) preferably has the number of carbons equal to or less than the alkyl group of butyl (meth)acrylate.

A copolymerization amount of a (meth) acrylic-based monomer containing a hydroxyl group (a2) is in the range of from 0.01 to 5 parts by weight relative to 100 parts by weight of an alkyl (meth)acrylate (a1). If a copolymerization amount of a (meth)acrylic-based monomer containing a hydroxyl group (a2) is less than 0.01 parts by weight, cross-linking points with an isocyanate cross-linking agent are smaller in density, which is unpreferable in regard to adherence to an optical film and durability. On the other hand, if the copolymerization amount exceeds 5 parts by weight, cross-linking points are excessively large in density, which is unpreferable in regard to stress relaxability. A copolymerization amount of a (meth)acrylic-based monomer containing a hydroxyl group (a2) is preferably in the range of from 0.01 to 4 parts by weight and more preferably in the range of from 0.03 to 3 parts by weight.

Note that a (meth)acrylic-based polymer (A) can contain an alkyl (meth)acrylate (a1) and a (meth)acrylic-based monomer containing a hydroxyl group (a2), and in addition thereto, other copolymerizable components. Preferable examples of other copolymerizable components include: compounds each without a functional group such as benzyl (meth)acrylate; methoxyethyl (meth)acrylate; ethoxymethyl (meth)acrylate; phenoxyethyl (meth)acrylate; (meth)acrylamide; vinyl acetate; and (meth)acrylonitrile, on which no limitation is placed. A copolymerization amount of each of the described above is preferably 100 parts by weight or less and more preferably 50 parts by weight or less relative to 100 parts by weight of an alkyl (meth)acrylate (a1).

Average molecular weight of the acrylic polymer is not limited, but the weight average molecular weight of about 500,000 to 2,500,000 is preferable. The (meth)acrylic-based polymer may be produced by a variety of known methods, for example, by a method appropriately selected from radical polymerization methods including a bulk polymerization method, a solution polymerization method and a suspension polymerization method. A variety of known radical polymerization initiators may be used such as azo initiators and peroxide initiators. The reaction is generally performed at a temperature of about 50° C. to about 80° C. for a time period of 1 to 8 hours. Among the above methods, the solution polymerization method is particularly preferred, and ethyl acetate, toluene, or the like is generally used as an acrylic polymer solvent. The concentration of the solution is generally from about 20 to about 80% by weight.

In a case where a peroxide is used as a polymerization initiator, a residual peroxide remaining unused in a polymerization reaction can also be used in a cross-linking reaction. In that case, a residual quantity of the peroxide is measured and if a proportion of a peroxide is less than a predetermined quantity, the peroxide can be added so as to be a predetermined quantity for use.

An acrylic-based pressure sensitive adhesive of the invention contains 100 parts by weight of a (meth)acrylic-based polymer (A); 0.02 to 2 parts by weight of a peroxide (B); and 0.001 to 2 parts by weight of an isocyanate-based compound (C), the latter components being expressed as a value relative to 100 parts by weight of the (meth)acrylic-based polymer (A).

A peroxide (B) can be any peroxide without placing specific limitation thereon as far as it can generate a radical by heating to thereby enable cross-linking to be formed in a (meth)acrylic-based polymer (A). If a productivity is considered, a one minute half-life temperature is preferably in the range of about 70 to 170° C. and more preferably in the range of about 90 to 150° C. If a one minute half-life temperature is excessively low, a cross-linking reaction occurs in storage prior to coating a pressure sensitive adhesive to thereby raise a viscosity of a coating material to impossibility of coating in some case. On the other hand, if a one minute half-life temperature is excessively high, a temperature in a cross-linking reaction is raised to thereby unpreferably cause other side effects, to disable a target characteristic to be achieved due to insufficiency of decomposition, or to cause a cross-linking reaction to progress over time thereafter in the presence of the residual peroxide.

Note that a half-life of a peroxide is an index expressing a decomposition speed of the peroxide and a time in which a decomposed quantity of the peroxide is a half of the total quantity, and data of a decomposition temperature to achieve a half-life of an arbitrary time and a half-life at an arbitrary temperature is given in maker's catalogues, an example of which is a catalogue of organic peroxides, ninth edition, edited by NOF Corporation. (May, 2003).

Examples of such peroxides (B) include: di(2-ethylhexyl) peroxydicarbonate; di(4-t-butylcyclohexyl)peroxydicarbonate; di-sec-butyl peroxydicarbonate; t-butyl peroxyneodecanoate, t-hexyl peroxypivalate; t-butyl peroxypivalate; dilauroyl peroxide; di-n-octanoyl peroxide; 1,1,3,3-tetramethylbutyl peroxyisobutylate; dibenzoyl peroxide; and the like. Among them, preferably used are di(4-t-butylcyclohexyl)peroxydicarbonate, dilauroyl peroxide and dibenzoyl peroxide, which are especially excellent in cross-linking reaction efficiency.

A quantity of use of a peroxide (B) is in the range of from 0.02 to 2 parts by weight, preferably in the range of from 0.05 to 1 parts by weight and more preferably in the range of from 0.06 to 0.5 parts by weight, relative to 100 parts by weight of a (meth) acrylic-based polymer (A). If a quantity of use of a peroxide (B) is less than 0.02 parts by weight, it is unpreferable in regard to durability since a cross-linking reaction is insufficient. On the other hand, if a quantity of use of a peroxide (B) exceeds 2 parts by weight, it is unpreferable since cross-linking occurs in excess, thereby degrading adherence.

An isocyanate-based compound (C) contains an isocyanate compound. Examples of the isocyanate compounds include: isocyanate monomers such as tolylene diisocyanate; chlorophenylene diisocyanate, hexamethylene diisocyanate, tetramethylene diisocyanate, isophorone diisocyanate; xylylene diisocyanate, diphenylmethane diisocyanate, hydrogenated diphenylmethane diisocyanate, and adduct type isocyanate compounds obtained by adding the isocyanate monomer to a polyhydroxy alcohol, for example trimethylolpropane; and urethane prepolymer type isocyanates obtained by addition reaction of an isocyanurate compound, a biuret type compound, in addition thereto a known polyether polyol, a known polyester polyol, a acryl polyol, a polybutadiene polyol, a polyisoprene polyol and the like. Among the isocyanate-based compounds (C), preferable is an adduct type isocyanate compound such as xylylene diisocyanate in terms of improvement on adherence to an optical film.

A quantity of use of an isocyanate-based compound (C) is in the range of from 0.001 to 2 parts by weight, preferably in the range of from 0.01 to 1.5 parts by weight and more preferably in the range of from 0.02 to 1 part by weight relative to 100 parts by weight of a (meth)acrylic-based polymer (A). If a quantity of use of an isocyanate-based compound (C) is less than 0.001 parts by weight, it is unpreferable in regard to adherence to an optical film and durability. On the other hand, if a quantity of use of an isocyanate-based compound (C) exceeds 2 parts by weight, adherence is improved according to a quantity in excess, whereas the range is still preferable in consideration of a total balance in controlling a degree of cross-linking with handling ability mainly affected by cross-linking of a peroxide (B).

If necessary, the acryl-based pressure-sensitive adhesive of the present invention may conveniently contain various types of additives such as tackifiers, plasticizers, fillers such as glass fibers, glass beads, metal power, or any other inorganic powder, pigments, colorants, antioxidants, ultraviolet absorbers, and silane-coupling agents, without departing from the object of the invention. The pressure-sensitive adhesive layer may also contain fine particles so as to have light diffusion properties.

Of the additives, preferable is a silane coupling agent. Examples of silane coupling agents include: silicon compounds having an epoxy structure such as 3-glycidoxypropyltrimethoxysilane, 3-glycidoxypropylmethyldimethoxysilane and 2-(3,4-epoxycyclohexyl) ethyltrimethoxysilane; amino group containing silicon compounds such as 3-aminopropyltrimethoxysilane, N-(2-aminoethyl)3-aminopropyltrimethoxysilane and N-(2-aminoethyl)3-aminopropylmethyldimethoxysilane; 3-chroropropyltrimethoxysilane; an acetoacetyl group containing trimethoxysilane; (meth)acrylic group containing silane coupling agents such as 3-chroropropyltrimethoxysilane; an acetoacetyl group containing trimethoxysilane; 3-acryloxypropyltrimethoxysilane, and 3-methacryloxypropyltrimethoxysilane; and isocyanate group containing silane coupling agents such as 3-isocyanatepropyltriethoxysilane. Especially preferably used are 3-glycidoxypropyltrimethoxysilane and a trimethoxysilane containing an acetoacetyl group since peeling is effectively suppressed. A silane coupling agent can impart an effect of durability and an effect of suppressing peeling off especially in humidified environment. A quantity of use of a silane coupling agent is 1 part by weight or less, preferably in the range of from 0.01 to 1 part by weight and more preferably in the range of from 0.02 to 0.6 parts by weight relative to 100 parts by weight of a (meth) acrylic-based polymer (A). If a quantity of use of a silane coupling agent is larger, an adhering strength to a liquid crystal cell is excessively large, which creates a case where an influence is given on reworkability.

No specific limitation is imposed on a material made of an anchor coat layer inserted between a pressure sensitive adhesive layer on a pressure sensitive adhesion type optical film of the invention and an optical film, while preferable is a material, showing good adherence to both the pressure sensitive adhesive layer and the optical film, and forming a film excellent in cohesive force. Examples of materials showing such properties include: various kinds of polymers, a sol of a metal oxide, silica sol and the like. Among them, especially preferably used are polymers.

Examples of the polymers include: a polyurethane-based resin, a polyester-based resin and polymers each including an amino group in a molecule. States in use of the polymers may be any of a solvent-soluble type, a water-dispersion type and a water-soluble type. Examples thereof include: a water-soluble polyurethane; a water-soluble polyester; and a water-soluble polyamide; and water-dispersion type resins (an ethylene-vinyl acetate-based emulsion, a (meth)acrylic-based emulsion and the like). Besides, water-dispersion types include: emulsions of various kinds of resins such as polyurethane, polyester, polyamide and the like obtained by using an emulsifying agent, emulsions of the resins obtained from self-emulsifiable resins obtained by introducing an anion group, a cation group or a nonion group each of a water-dispersible hydrophillic group into the resins and the like. Besides, an ionic polymer complex can be used.

Such polymers are preferably polymers each containing a functional group having a reactivity with an isocyanate-based compound (C) in a pressure sensitive adhesive. The polymers are preferably polymers each containing an amino group in a molecule. Especially preferably used is a polymer having a primary amino group at the terminal ends.

Examples of polymers containing an amino group in a molecule include: polyethyleneimine; polyallylamine; polyvinylamine; polyvinylpyridine; polyvinylpyrrolidine; a polymer of an amino group containing monomer such as dimethylaminoethyl acrylate. Among them, preferable is a polyethyleneimine.

No specific limitation is imposed on a polyethyleneimine and various kinds of polyethyleneimines can be used. No specific limitation is placed on a weight average molecular weight of a polyethyleneimine, whereas a weight average molecular weight thereof is usually in the range of about 100 to 1,000,000. Examples thereof as commercial products are named Epomin SP series (SP-003, SP-006, SP-012, SP-018, SP-103, SP-110, SP-200, and the like) and Epomin P-1000 and the like manufactured by Nippon Shokubai Co., Ltd. Among them, preferable is Epomin P-1000.

Any of polyethyleneimines may be used as far as it has a polyethylene structure and examples thereof include: an ethyleneimine adduct to a polyacrylic acid ester and/or a polyethyleneimine adduct. A polyacrylic acid ester is obtained by emulsion polymerization according to an ordinary method from an alkyl (meth)acrylate of which a base polymer of an acrylic-based pressure sensitive adhesive (a (meth)acrylic-based polymer) exemplified above is constituted and a copolymerizable monomer therewith. A copolymerizable monomer that is used is a monomer having a functional group such as a carboxyl group to react the copolymerizable monomer with ethyleneimine. A proportion of use of a monomer having a functional group such as carboxyl group is adjusted properly depending on a proportion of ethyleneimine as a reactant. A copolymerizable monomer to be used is preferably a styrene monomer, as described above. A copolymerizable monomer can also be an grafted adduct of polyethyleneimine by reacting a separately synthesized polyethyleneimine with a carboxyl group or the like in an acrylic acid ester. For example, especially preferable as commercial products are Polyment NK-380 and 350 manufactured by Nippon Shokubai Co., Ltd.

An ethyleneimine adduct and/or a polyethyleneimine adduct of an acrylic-based polymer emulsion can be used. An example of a commercial product is Polyment SK-1000 manufactured by Nippon Shokubai Co., Ltd.

No specific limitation is placed on a polyallylamine and examples thereof include: diallylamine hydrochloric acid salt-sulfur dioxide copolymer, diallylmethylamine hydrochloric acid copolymer, polyallylamine hydrochloric acid salt, allyamine-based compounds such as polyallylamine, condensates of polyalkylene polyamine and dicarboxylic acid such as diethylene triamine and an epihalohydrin adduct of the condensate, polyvinylamine and the like. Polyallylamine is preferable since it is soluble in water/alcohol. No specific limitation is imposed on a weight average molecular weight of a polyallylamine, whereas a weight average molecular weight thereof is preferably in the range of about 10,000 to 100,000.

In formation of an anchor coat layer, a strength of the anchor coat layer can be raised by mixing a polymer containing an amino group and a compound reacting with a polymer containing an amino group together to thereby cause cross-linking. An epoxy compound or the like can be exemplified as a compound reacting with a polymer containing an amino group.

The optical film for use in the pressure-sensitive adhesive optical film of the invention may be any type of film that has been used to form image displays such as liquid crystal displays. For example, the optical film serves as a polarizing plate. A polarizing plate comprising a polarizer and a transparent protective film provided on one side or both sides of the polarizer is generally used.

A polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type alignment films, such as dehydrated polyvinyl alcohol and dehydrochlorinated polyvinyl chloride, etc. may be mentioned. In these, a polyvinyl alcohol type film on which dichromatic materials such as iodine, is absorbed and aligned after stretched is suitably used. Although thickness of polarizer is not especially limited, the thickness of about 5 to 80 µm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

As a materials forming the transparent protective film prepared on one side or both sides of the above-mentioned polarizer, with outstanding transparency, mechanical strength, heat stability, moisture cover property, isotropy, etc. may be preferable. For example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming a protective film, polyolefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; allylate type polymers; polyoxymethylene type polymers; epoxy type polymers; or blend polymers of the above-mentioned polymers may be mentioned. The transparent protective film can be formed as a cured layer made of heat curing type or ultraviolet ray curing type resins, such as acryl based, urethane based, acryl urethane based, epoxy based, and silicone based.

Moreover, as is described in Japanese Patent Laid-Open Publication No. 2001-343529 (WO 01/37007), polymer films, for example, resin compositions including (A) thermoplastic resins having substituted and/or non-substituted imido group is in side chain, and (B) thermoplastic resins having substituted and/or non-substituted phenyl and nitrile group in sidechain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used.

In general, a thickness of the protection film, which can be determined arbitrarily, is 1 to 500 μm, especially 5 to 200 μm in viewpoint of strength, work handling and thin layer.

The protective film is preferably as colorless as possible. Thus, a protective film is preferably used which has a film-thickness-direction retardation of −90 nm to +75 nm, wherein the retardation (Rth) is represented by the formula: $Rth = [(nx+ny)/(2-nz)]d$, wherein nx and ny are each a principal refractive index in the plane of the film, nz is a refractive index in the film-thickness direction, and d is the thickness of the film. If a protective film with such a thickness-direction retardation value (Rth) of −90 nm to +75 nm is used, coloring (optical coloring) of the polarizing plate can be almost avoided, which could otherwise be caused by any other protective film. The thickness-direction retardation (Rth) is more preferably from −80 nm to +60 nm, particularly preferably from −70 nm to +45 nm.

As the transparent protective film, if polarization property and durability are taken into consideration, cellulose based polymer, such as triacetyl cellulose, is preferable, and especially triacetyl cellulose film is suitable. In addition, when transparent protective films are provided on both sides of the polarizer, transparent protective films comprising same polymer material may be used on both of a front side and a back side, and transparent protective films comprising different polymer materials etc. may be used. Isocyanate based adhesives, polyvinyl alcohol based adhesives, gelatin based adhesives, vinyl based latex based, aqueous polyester based adhesives, and etc. may be used for adhesion processing for the above-mentioned polarizers and transparent protective films.

As the opposite side of the polarizing-adhering surface above-mentioned transparent protective film, a film with a hard coat layer and various processing aiming for antireflection, sticking prevention and diffusion or anti glare may be used.

A hard coat processing is applied for the purpose of protecting the surface of the polarization plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarization plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarization plate to disturb visual recognition of transmitting light through the polarization plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 μm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight parts to the transparent resin 100 weight parts that forms the fine concavo-convex structure on the surface, and preferably 5 to 25 weight parts. An anti glare layer may serve as a diffusion layer (viewing angle expanding function etc.) for diffusing transmitting light through the polarization plate and expanding a viewing angle etc.

In addition, the above-mentioned antireflection layer, sticking prevention layer, diffusion layer, anti glare layer, etc. may be built in the protective film itself, and also they may be prepared as an optical layer different from the protective film.

Further an optical film of the invention may be used as other optical layers, such as a reflective plate, a transflective plate, a retardation plate (a half wavelength plate and a quarter wavelength plate included), and a viewing angle compensation film, which may be used for formation of a liquid crystal display etc. These are used in practice as a optical film, or as one layer or two layers or more of optical layers laminatd with polarizing plate.

Especially preferable polarizing plates are; a reflection type polarization plate or a transflective type polarization plate in which a reflective plate or a transflective reflective plate is further laminated onto a polarizing plate of the present invention; an elliptically polarizing plate or a circular polarizing plate in which a retardation plate is further laminated onto the polarizing plate; a wide viewing angle polarization plate in which a viewing angle compensation film is further laminated onto the polarizing plate; or a polarizing plate in which a brightness enhancement film is further laminated onto the polarizing plate.

A reflective layer is prepared on a polarization plate to give a reflection type polarization plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarization plate may be formed using suitable methods, such as a method in which a reflective layer of metal etc. is, if required, attached to one side of a polarization plate through a transparent protective layer etc.

As an example of a reflection type polarization plate, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particle into the above-mentioned protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a transparent protective layer directly using, for example, suitable methods of a vacuum evaporation method, such as a vacuum deposition method, an ion plating method, and a sputtering method, and a plating method etc.

Instead of a method in which a reflection plate is directly given to the protective film of the above-mentioned polarization plate, a reflection plate may also be used as a reflective sheet constituted by preparing a reflective layer on the suitable film for the transparent film. In addition, since a reflective layer is usually made of metal, it is desirable that the reflective side is covered with a protective film or a polarization plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the above-mentioned reflective layer as a transflective type reflective layer, such as a half-mirror etc. that reflects and transmits light. A transflective type polarization plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarization plate. That is, the transflective type polarization plate is useful to obtain of a liquid crystal display of the type that saves energy of light sources, such as a back light, in a well-lighted atmosphere, and can be used with a built-in light source if needed in a comparatively dark atmosphere etc.

A description of the above-mentioned elliptically polarization plate or circularly polarization plate on which the retardation plate is laminated to the polarization plates will be made in the following paragraph. These polarization plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called $\lambda/4$ plate) is used. Usually, half-wavelength plate (also called $\lambda/2$ plate) is used, when changing the polarization direction of linearly polarized light.

Elliptically polarization plate is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarization plate in which three-dimensional refractive index is controlled may also preferably compensate (prevent) coloring produced when a screen of a liquid crystal display is viewed from an oblique direction. Circularly polarization plate is effectively used, for example, when adjusting a color tone of a picture of a reflection type liquid crystal display that provides a colored picture, and it also has function of antireflection.

As retardation plates, birefringence films obtained by uniaxial or biaxial stretching polymer materials, oriented films of liquid crystal polymers, and materials in which orientated layers of liquid crystal polymers are supported with films may be mentioned. Although a thickness of a retardation plate also is not especially limited, it is in general approximately from 20 to 150 µm.

As polymer materials, for example, polyvinyl alcohols, polyvinyl butyrals, polymethyl vinyl ethers, poly hydroxyethyl acrylates, hydroxyethyl celluloses, hydroxypropyl celluloses, methyl celluloses, polycarbonates, polyarylates, polysulfones, polyethylene terephthalates, polyethylene naphthalates, polyethersulfones, polyphenylene sulfides, polyphenylene oxides, polyallyl sulfones, polyvinyl alcohols, polyamides, polyimides, polyolefins, polyvinyl chlorides, cellulose type polymers, or bipolymers, terpolymers, graft copolymers, blended materials of the above-mentioned polymers may be mentioned. These polymer raw materials make oriented materials (stretched film) using a stretching process and the like.

As liquid crystalline polymers, for example, various kinds of polymers of principal chain type and side chain type in which conjugated linear atomic groups (mesogens) demonstrating liquid crystalline orientation are introduced into a principal chain and a side chain may be mentioned. As examples of principal chain type liquid crystalline polymers, polymers having a structure where mesogen groups are combined by spacer parts demonstrating flexibility, for example, polyester based liquid crystalline polymers of nematic orientation property, discotic polymers, cholesteric polymers, etc. may be mentioned. As examples of side chain type liquid crystalline polymers, polymers having polysiloxanes, polyacrylates, polymethacrylates, or polymalonates as a principal chain structure, and polymers having mesogen parts comprising para-substituted ring compound units providing nematic orientation property as side chains via spacer parts comprising conjugated atomic groups may be mentioned. These liquid crystalline polymers, for example, is obtained by spreading a solution of a liquid crystal polymer on an orientation treated surface where rubbing treatment was performed to a surface of thin films, such as polyimide and polyvinyl alcohol, formed on a glass plate and or where silicon oxide was deposited by an oblique evaporation method, and then by heat-treating.

A retardation plate may be a retardation plate that has a proper retardation according to the purposes of use, such as various kinds of wavelength plates and plates aiming at compensation of coloring by birefringence of a liquid crystal layer and of visual angle, etc., and may be a retardation plate in which two or more sorts of retardation plates is laminated so that optical properties, such as retardation, may be controlled.

The above-mentioned elliptically polarization plate and an above-mentioned reflected type elliptically polarization plate are laminated plate combining suitably a polarization plate or a reflection type polarization plate with a retardation plate. This type of elliptically polarization plate etc. may be manufactured by combining a polarization plate (reflected type) and a retardation plate, and by laminating them one by one separately in the manufacture process of a liquid crystal display. On the other hand, the polarization plate in which lamination was beforehand carried out and was obtained as an optical film, such as an elliptically polarization plate, is excellent in a stable quality, a workability in lamination etc., and has an advantage in improved manufacturing efficiency of a liquid crystal display.

A viewing angle compensation film is a film for extending viewing angle so that a picture may look comparatively clearly, even when it is viewed from an oblique direction not from vertical direction to a screen. As such viewing angle compensation retardation plate, in addition, a film having birefringence property that is processed by uniaxial stretching or orthogonal bidirectional stretching and a biaxially stretched film as inclined orientation film etc. may be used. As inclined orientation film, for example, a film obtained using a method in which a heat shrinking film is adhered to a polymer film, and then the combined film is heated and stretched or shrunk under a condition of being influenced by a shrinking force, or a film that is oriented in oblique direction may be mentioned. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

The polarization plate with which a polarization plate and a brightness enhancement film are adhered together is usually used being prepared in a backside of a liquid crystal cell. A brightness enhancement film shows a characteristic that reflects linearly polarization light with a predetermined polarization axis, or circularly polarization light with a predetermined direction, and that transmits other light, when natural light by back lights of a liquid crystal display or by reflection from a back-side etc., comes in. The polarization plate, which is obtained by laminating a brightness enhancement film to a polarization plate, thus does not transmit light without the predetermined polarization state and reflects it, while obtaining transmitted light with the predetermined polarization state by accepting a light from light sources, such as a backlight. This polarization plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarization plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film; an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported; etc. may be mentioned.

Therefore, in the brightness enhancement film of a type that transmits a linearly polarized light having the above-mentioned predetermined polarization axis, by arranging the polarization axis of the transmitted light and entering the light into a polarization plate as it is, the absorption loss by the polarization plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light region, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarization plate and a brightness enhancement film may consist of one or more retardation layers.

In addition, also in a cholesteric liquid-crystal layer, a layer reflecting a circularly polarized light in a wide wavelength ranges, such as a visible-light region, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarization plate may consist of multi-layered film of laminated layers of a polarization plate and two of more of optical layers as the above-mentioned separated type polarization plate. Therefore, a polarization plate may be a reflection type elliptically polarization plate or a semi-transmission type elliptically polarization plate, etc. in which the above-mentioned reflection type polarization plate or a transflective type polarization plate is combined with above described retardation plate respectively.

Although an optical film with the above described optical layer laminated to the polarizing plate may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised. Proper adhesion means, such as an adhesive layer, may be used for laminating. On the occasion of adhesion of the above described polarizing plate and other optical films, the optical axis may be set as a suitable configuration angle according to the target retardation characteristics etc.

Then, description will be given of a fabricating method for an pressure sensitive adhesion type optical film. No specific limitation is placed on a formation method for a pressure sensitive adhesive layer and the following methods can be used: one of which is a method in which a pressure sensitive adhesive solution is coated on an optical film and the film is dried and another of which is a method in which a pressure sensitive adhesive layer is transferred with a release sheet on which the pressure sensitive adhesive layer is formed. Coating methods that can be adopted are roll coating methods such as a reverse coating method and a gravure coating method, a spin coating method, a screen coating method, a fountain coating method, a dipping method, a spray method and the like. No specific limitation is placed on a thickness of a pressure sensitive adhesive layer, whereas a thickness thereof is preferably in the range of about 10 to 40 μm.

In manufacture of a pressure sensitive adhesive layer, a gel percent in the cross-linked pressure sensitive adhesive layer is preferably adjusted in the range of 40 to 90 wt %, more preferably adjusted in the range of from 45 to 85 wt % and further more preferably adjusted in the range of from 50 to 80 wt % by controlling a quantity of addition of a cross-linking agent. If a gel percent is less than 40 wt %, durability tends to decrease, while if a gel percent exceeds 90 wt %, a stress relaxability tends to be degraded.

A predetermined gel percent can be adjusted by controlling a quantity of addition of a cross-linking agent such as a peroxide in consideration of influences of a cross-linking treatment temperature and a cross-linking treatment time. A cross-linking treatment temperature and a cross-linking treatment time are preferably adjusted and set, for example, so that a decomposition quantity of a peroxide contained in a pressure sensitive adhesive composition for an optical film is 75 wt % or more, more preferably 80 wt % or more and further more preferably 85 wt % or more. If a decomposition quantity of a peroxide is less than 75 wt %, a residual quantity of the peroxide in the pressure sensitive adhesive composition for an optical film is larger and a cross-linking reaction occurs over time even after a heat treatment, unpreferably leading to a case where a gel percent eventually exceeds 90 wt %.

To be more concrete, for example, at a one minute half-life temperature as a heat treatment temperature, a decomposition quantity of a peroxide is 50 wt % in 1 minute and 75 wt % in 2 minute; therefore, a heat treatment time for 2 minute or more is required. If a half-life (a time required for reduction to a half quantity) of a peroxide at a heat treatment temperature is 30 sec, a heat treatment time for 1 minute or more is necessary and if a half-life (a time required for reduction to a half quantity) of a peroxide at a cross-linking treatment temperature is 5 minute, a cross-linking treatment time for 10 minute or more is necessary.

In such a way, a cross-linking treatment temperature and a cross-linking treatment time for a peroxide to be used can be theoretically calculated from a half-life (a time required for reduction to a half quantity) on the assumption that the peroxide is decomposed in linear proportion, thereby enabling a quantity of addition to be properly adjusted. On the other hand, since as a higher temperature is adopted, a possibility of a side reaction is raised, a cross-linking temperature is preferably 170° C. or less.

Note that a decomposition quantity of the peroxide remained after a reaction treatment can be measured with, for example, HPLC (high performance liquid chromatography).

To be more concrete, a pressure sensitive adhesive composition after cross-linking is sampled by about 0.3 g at a time, 10 mL of acetonitrile is added into the sample, the mixture is shaken at 120 r. p. m for 8 hr at 25° C. for 8 hr, the mixture is filtered with a membrane filter (a pore size of 0.45 μm) and about 10 μL of a filtrate is injected into HPLC, thereby enabling a residual quantity of a peroxide to be obtained. For quantification, a calibration curve is prepared using the same peroxide and a quantity of the peroxide is obtained based on the curve.

In a case where an anchor coat layer is provided, the anchor coat layer is formed on the optical film and thereafter, a pressure sensitive adhesive layer is formed. For example, an anchor component solution such as a polyethyleneimine aqueous solution is coated using a coating method such as a coating method, a dipping method, a spray method or the like and a coat is dried to form an anchor coat layer. A thickness of an anchor coat layer is preferably in the range of about 10 to 5,000 nm and more preferably in the range of about 50 to 500 nm. If a thickness of an anchor coat layer is excessively small, a case arises where no property thereof as a bulk is exerted, a strength is insufficient and adherence is insufficient. If a thickness thereof is excessively large, a possibility occurs that an optical characterisitic is degraded.

In formation of a pressure sensitive adhesive layer, an activation treatment can be applied to an optical film. Various kinds of methods can be adopted in an activation treatment and, for example, a corona treatment, a low pressure UV treatment, a plasma treatment or the like can be adopted. Besides, an antistatic layer can be formed.

Examples of constituent materials of a release sheet include: proper thin items such as paper; synthetic resin films made of polyethylene, polypropylene, polyethylene terephthalate; a rubber sheet, paper, cloth, unwoven fabric, net, a foam sheet and a metal foil, and a laminate thereof. In order to enhance releasability from a pressure sensitive adhesive layer, a release treatment imparting a low adherence, such as a silicone treatment, a long chain alkylation treatment or a fluorination treatment, may be applied onto a surface of a release sheet when required.

In addition, in the present invention, ultraviolet absorbing property may be given to the above-mentioned each layer of the adhesive optical film of the invention, such as the optical film, and the adhesive layer etc., using a method of adding UV absorbents, such as salicylic acid ester type compounds, benzophenol type compounds, benzotriazol type compounds, cyano acrylate type compounds, and nickel complex salt type compounds.

The pressure-sensitive adhesive optical film of the invention is preferably used to form various types of image displays such as liquid crystal displays. Liquid crystal displays may be formed according to conventional techniques. Specifically, liquid crystal displays are generally formed by appropriately assembling a liquid crystal cell and the pressure-sensitive adhesive optical film and optionally other components such as a lighting system and incorporating a driving circuit according to any conventional technique, except that the optical film of the invention is used. Any type of liquid crystal cell may also be used such as a TN type, an STN type and a π type.

Suitable liquid crystal displays, such as liquid crystal display with which the above-mentioned optical film has been located at one side or both sides of the liquid crystal cell, and with which a backlight or a reflective plate is used for a lighting system may be manufactured. In this case, the adhesive optical film by the present invention may be installed in one side or both sides of the liquid crystal cell. When installing the optical films in both sides, they may be of the same type or of different type. Furthermore, in assembling a liquid crystal display, suitable parts, such as diffusion plate, antiglare layer, antireflection film, protective plate, prism array, lens array sheet, optical diffusion plate, and backlight, may be installed in suitable position in one layer or two or more layers.

Subsequently, organic electro luminescence equipment (organic EL display) will be explained. Generally, in organic EL display, a transparent electrode, an organic luminescence layer and a metal electrode are laminated on a transparent substrate in an order configuring an illuminant (organic electro luminescence illuminant). Here, a organic luminescence layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic luminescence layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in a intermediate process is the same as a mechanism in common diodes, and, as is expected, there is a strong non-linear relationship between electric current and luminescence strength accompanied by rectification nature to applied voltage.

In an organic EL display, in order to take out luminescence in an organic luminescence layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic luminescence layer is formed by a very thin film about 10 nm in thickness. For this reason, light is transmitted nearly completely through organic luminescence layer as through transparent electrode. Consequently, since the light that enters, when light is not emitted, as incident light from a surface of a transparent substrate and is transmitted through a transparent electrode and an organic luminescence layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic luminescence layer that emits light by impression of voltage, and at the same time equipped with a metal electrode on a back side of organic luminescence layer, a retardation plate may be installed between these transparent electrodes and a polarization plate, while preparing the polarization plate on the surface side of the transparent electrode.

Since the retardation plate and the polarization plate have function polarizing the light that has entered as incident light from outside and has been reflected by the metal electrode, they have an effect of making the mirror surface of metal electrode not visible from outside by the polarization action.

If a retardation plate is configured with a quarter wavelength plate and the angle between the two polarization directions of the polarization plate and the retardation plate is adjusted to π/4, the mirror surface of the metal electrode may be completely covered.

This means that only linearly polarized light component of the external light that enters as incident light into this organic EL display is transmitted with the work of polarization plate. This linearly polarized light generally gives an elliptically polarized light by the retardation plate, and especially the retardation plate is a quarter wavelength plate, and moreover when the angle between the two polarization directions of the polarization plate and the retardation plate is adjusted to π/4, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarization plate, it cannot be transmitted through the polarization plate. As the result, mirror surface of the metal electrode may be completely covered.

EXAMPLES

While concrete description will be given of the invention using examples below, the invention is not limited to the examples. Note that the term "part or parts" and "%" should read "part or parts by weight" and "wt %".

(Fabrication of Polarizer)

A polyvinyl alcohol film with a thickness of 80 μm was stretched in a 0.3% iodine aqueous solution at a stretch ratio of 3 at 30° C. between rolls different in speed. Then, the polyvinyl alcohol film was stretched in an aqueous solution containing 4% boric acid and a 10% potassium iodide at 60° C. to a total stretch ratio of 6. Then, the stretched film was immersed and washed in a 1.5% potassium iodide aqueous solution for 10 sec at 30° C., and dried for 4 min at 50° C. to thereby obtain a polarizer.

(Fabrication of Polarizing Plate A)

Two saponified triacetyl cellulose films with a thickness of 80 μm are adhered onto respective both surfaces of the polarizer to thereby obtain a polarizing plate A.

(Fabrication of Polarizing Plate B)

A film obtained by aligning a discotic liquid crystal (manufactured by Fuji Photo Film CO., Ltd. with a trade name of WV-SA128) was saponified and thereafter, the discotic liquid crystal was adhered onto one surface of the polarizer on one surface of a triacetyl cellulose film with a thickness of 80 μm so that the discotic liquid crystal was exposed to the outside. Onto the other surface of the polarizer, a saponified triacetyl cellulose film with a thickness of 80 μm was adhered, thereby fabricating a polarizing plate B.

(Fabrication of Polarizing Plate C)

A polarizing plate C was fabricated in a similar way to that in the case of the polarizing plate B with the exception that in fabrication of the polarizing plate B, a norbornene-based film with a thickness of 80 μm (manufactured by JSR Corporation with a trade name of Arton) was used instead of WV-SA128.

Example 1

(Preparation of Pressure Sensitive Adhesive)

Into a reaction vessel with a cooling tube, a nitrogen introducing tube, a thermometer and an agitator, 99 parts of butyl acrylate, 1.0 part of 4-hydroxybutyl acrylate and 0.3 part of 2,2-azobisisobutylonitrile were added together with ethyl acetate, the mixture was subjected to a reaction at 60° C. in a nitrogen gas stream for 4 hr, thereafter ethyl acetate was added into the reaction liquid to obtain a solution (with a solid matter concentration of 30%) containing an acrylic-based polymer with a weight average molecular weight of 1,650,000. Mixed into the acrylic-based polymer solution were 0.15 part of dibenzoyl peroxide (manufactured by NOF Corporation. with a trade name of Nyper BO-Y), 0.02 part of trimethylolpropane-xylylenediisocyanate adduct. (manufactured by Mitsui Takeda Chemicals Inc. with a trade name Takenate D110N) and 0.2 part of a silane coupling agent (manufactured by Soken Chemical & Engineering Co., Ltd. with a trade name of A-100, which is acetoacetyl group containing silane coupling agent) relative to 100 parts of a solid matter of the acrylic-based polymer solution to thereby obtain an acrylic-based pressure sensitive adhesive.

(Fabrication of Pressure Sensitive Adhesion Type Optical Film)

A pressure sensitive adhesive layer with a thickness of 20 μm was obtained by coating the pressure sensitive adhesive on a separator constituted of a polyester film surface treated with a solicone-based release agent to heat a coat at 155° C. for 3 min. The pressure sensitive adhesive layer was transferred onto one surface of a polarizing plate A from the separator on which the pressure sensitive adhesive layer was formed to thereby fabricate a pressure sensitive adhesion type polarizing plate.

Example 2

(Formation of Anchor Coat Layer)

A solution type polyethyleneimine-based resin (an ethyleneimine adduct of a polyacrylic acid ester, manufactured by Nippon Shokubai Co., Ltd, with a trade name of Polyment NK380) was used, which was diluted into a solution with 4-methyl-2-pentanone to a solid matter content of 3%. The solution was coated on one surface of a polarzing plate A using a meyer bar #5 and thereafter, a volatile content was vaporized. A thickness of an anchor coat layer after drying was 120 nm.

(Fabrication of Pressure Sensitive Adhesion Type Optical Film)

A pressure sensitive adhesive layer with a thickness of 20 μm was obtained by coating the pressure sensitive adhesive obtained by Example 1 on a separator constituted of a polyester film surface treated with a solicone-based release agent to heat a coat at 150° C. for 5 min. The pressure sensitive adhesive layer was transferred onto the abovementioned anchor coat layer from the separator on which the pressure sensitive adhesive layer was formed to thereby fabricate a pressure sensitive adhesion type polarizing plate.

Example 3

(Preparation of Pressure Sensitive Adhesive)

An acrylic-based pressure sensitive adhesive was obtained in a similar way to that in Example 1, with the exception that in Example 1, mixed were 0.15 part of dibenzoyl peroxide (manufactured by NOF Corporation. with a trade name of Nyper BO-Y) and 0.08 part of trimethylolpropanetolylenediisocyanate and 0.2 part of a silane coupling agent (manufactured by Soken Chemical & Engineering Co., Ltd. with a trade name of A-100, which is acetoacetyl group containing silane coupling agent) relative to 100 parts of a solid matter of the acrylic-based polymer solution.

(Fabrication of Pressure Sensitive Adhesion Type Optical Film)

A pressure sensitive adhesive layer with a thickness of 20 μm was obtained by coating the pressure sensitive adhesive on a separator constituted of a polyester film surface treated with a solicone-based release agent to heat a coat at 150° C. for 5 min. The pressure sensitive adhesive layer was transferred onto one surface of a polarizing plate A from the separator on which the pressure sensitive adhesive layer was formed to thereby fabricate a pressure sensitive adhesion type polarizing plate.

Example 4

(Preparation of Pressure Sensitive Adhesive)

An acrylic-based pressure sensitive adhesive was obtained in a similar way to that in Example 1, with the exception that in Example 1, mixed were 0.1 part of dibenzoyl peroxide (manufactured by NOF Corporation. with a trade name of Nyper BO-Y) and 0.035 part of trimethylolpropanexylenediisocyanate(TAKENATE D110N manufactured by Mitsui Takeda Chemicals, inc) and 0.2 part of a silane coupling agent (manufactured by Soken Chemical & Engineering Co., Ltd. with a trade name of A-100, which is acetoacetyl group containing silane coupling agent) relative to 100 parts of a solid matter of the acrylic-based polymer solution.

(Fabrication of Pressure Sensitive Adhesion Type Optical Film)

A pressure sensitive adhesive layer with a thickness of 20 μm was obtained by coating the pressure sensitive adhesive on a separator constituted of a polyester film surface treated with a solicone-based release agent to heat a coat at 155° C. for 3 min. The pressure sensitive adhesive layer was transferred onto one surface of a polarizing plate A from the separator on which the pressure sensitive adhesive layer was formed to thereby fabricate a pressure sensitive adhesion type polarizing plate.

Example 5

(Preparation of Pressure Sensitive Adhesive)

Into a reaction vessel with a cooling tube, a nitrogen introducing tube, a thermometer and an agitator, 99 parts of ethyl acrylate, 1.0 part of 4-hydroxybutyl acrylate and 0.3 part of 2,2-azobisisobutylonitrile were added together with ethyl acetate, the mixture was subjected to a reaction at 60° C. in a nitrogen gas stream for 4 hr, thereafter ethyl acetate was added into the reaction liquid to obtain a solution (with a solid matter concentration of 30%) containing an acrylic-based polymer with a weight average molecular weight of 1,800,000. Mixed into the acrylic-based polymer solution were 0.15 part of dibenzoyl peroxide (manufactured by NOF Corporation. with a trade name of Nyper BO-Y), 0.02 part of trimethylolpropanexylenediioscyanate (manufactured by Mitsui Takeda Chemicals Inc. with a trade name Takenate D110N) and 0.2 part of a silane coupling agent (manufactured by Soken Chemical & Engineering Co., Ltd. with a trade name of A-100, which is acetoacetyl group containing silane coupling agent) relative to 100 parts of a solid matter of the acrylic-based polymer solution to thereby obtain an acrylic-based pressure sensitive adhesive.

(Fabrication of Pressure Sensitive Adhesion Type Optical Film)

A pressure sensitive adhesive layer with a thickness of 20 μm was obtained by coating the pressure sensitive adhesive on a separator constituted of a polyester film surface treated with a solicone-based release agent to heat a coat at 155° C. for 3 min. The pressure sensitive adhesive layer was transferred onto one surface of a polarizing plate A from the separator on which the pressure sensitive adhesive layer was formed to thereby fabricate a pressure sensitive adhesion type polarizing plate.

Example 6

(Fabrication of Pressure Sensitive Adhesion Type Optical Film)

A pressure sensitive adhesion type polarizing plate was fabricated in a similar way to that in Example 1 with the exception that in Example 1, a polarizing plate B was used instead of a Polarizing plate A. Note that a pressure sensitive adhesive layer was adhered to the polarizing plate B on a surface of the film at which a discotic liquid crystal of the polarizing plate B was aligned.

Example 7

(Formation of Anchor Coat Layer)

A solution type polyethyleneimine-based resin (an ethyleneimine adduct of a polyacrylic acid ester, manufactured by Nippon Shokubai Co., Ltd, with a trade name of Polyment NK380) was used, which was diluted into a solution with 4-methyl-2-pentanone to a solid matter content of 3%. The solution was coated on one surface of the film obtained by aligning a discotic liquid crystal of a polarzing plate B using a meyer bar #5 and thereafter, a volatile content was vaporized. A thickness of an anchor coat layer after drying was 120 nm.

(Fabrication of Pressure Sensitive Adhesion Type Optical Film)

A pressure sensitive adhesive layer with a thickness of 20 μm was obtained by coating the pressure sensitive adhesive obtained by Example 1 on a separator constituted of a polyester film surface treated with a solicone-based release agent to heat a coat at 150° C. for 5 min. The pressure sensitive adhesive layer was transferred onto the abovementioned anchor coat layer from the separator on which the pressure sensitive adhesive layer was formed to thereby fabricate a pressure sensitive adhesion type polarizing plate.

Example 8

(Preparation of Pressure Sensitive Adhesive)

Into a reaction vessel with a cooling tube, a nitrogen introducing tube, a thermometer and an agitator, 98 parts of butyl acrylate, 2.0 parts of 4-hydroxybutyl acrylate and 0.3 part of 2,2-azobisisobutylonitrile were added together with ethyl acetate, the mixture was subjected to a reaction at 60° C. in a nitrogen gas stream for 4 hr, thereafter ethyl acetate was added into the reaction liquid to obtain a solution (with a solid matter concentration of 30%) containing an acrylic-based polymer with a weight average molecular weight of 1,800,000. Mixed into the acrylic-based polymer solution were 0.3 part of dibenzoyl peroxide (manufactured by NOF Corporation. with a trade name of Nyper BO-Y), 0.02 part of trimethylolpropanexylenediisocyanate(TAKENATE D110N manufactured by Mitsui Takeda Chemicals, inc) and 0.1 part of a silane coupling agent (manufactured by Soken Chemical & Engineering Co., Ltd. with a trade name of A-100, which is acetoacetyl group containing silane coupling agent) relative to 100 parts of a solid matter of the acrylic-based polymer solution to thereby obtain an acrylic-based pressure sensitive adhesive.

(Fabrication of Pressure Sensitive Adhesion Type Optical Film)

A pressure sensitive adhesive layer with a thickness of 20 μm was obtained by coating the pressure sensitive adhesive on a separator constituted of a polyester film surface treated with a solicone-based release agent to heat a coat at 155° C. for 3 min. The pressure sensitive adhesive layer was transferred onto one surface of a polarizing plate A from the separator on which the pressure sensitive adhesive layer was formed to thereby fabricate a pressure sensitive adhesion type polarizing plate.

Example 9

(Preparation of Pressure Sensitive Adhesive)

An acrylic-based pressure sensitive adhesive was obtained in a similar way to that in Example 1, with the exception that in Example 1, mixed were 0.04 part of dibenzoyl peroxide (manufactured by NOF Corporation. with a trade name of Nyper BO-Y) and 0.005 part of trimethylolpropanexylenediisocyanate(TAKENATE D110N manufactured by Mitsui Takeda Chemicals, inc) and 0.2 part of a silane coupling agent (manufactured by Soken Chemical & Engineering Co., Ltd. with a trade name of A-100, which is acetoacetyl group containing silane coupling agent) relative to 100 parts of a solid matter of the acrylic-based polymer solution.

(Fabrication of Pressure Sensitive Adhesion Type Optical Film)

A pressure sensitive adhesion type polarizing plate was fabricated in a similar way to that in Example 2 with the exception that in Example 2, a polarizing plate C was used instead of a polarizing plate B. Note that a pressure sensitive adhesive layer was adhered onto an anchor coat provided on a corona treated norbornene-based film surface of the polarizing plate C.

Example 10

(Preparation of Pressure Sensitive Adhesive)

An acrylic-based polymer solution with a weight average molecular weight of 1,650,000 (at a solid matter concentration of 30%) was obtained in a similar way to that in Example 1 with the exception that in Example 1, 1.0 part of 2-hydroxyethyl acrylate was used instead of 1.0 part of 4-hydroxybutyl acrylate. Note that an acrylic-based pressure sensitive adhesive was obtained with a composition similar to that of Example 1 with the exception that in Example 1, the above-mentioned acrylic-based polymer solution was used instead of an acrylic-based polymer solution obtained in Example 1.

(Fabrication of Pressure Sensitive Adhesion Type Optical Film)

A pressure sensitive adhesive layer with a thickness of 20 μm was obtained by coating the pressure sensitive adhesive on a separator constituted of a polyester film surface treated with a solicone-based release agent to heat a coat at 155° C. for 3 min. The pressure sensitive adhesive layer was transferred onto one surface of a polarizing plate A from the separator on which the pressure sensitive adhesive layer was formed to thereby fabricate a pressure sensitive adhesion type polarizing plate.

Comparative Example 1

(Preparation of Pressure Sensitive Adhesive)

An acrylic-based pressure sensitive adhesive was obtained in a similar way to that in Example 1, with the exception that in Example 1, mixed were 0.07 part of trimethylolpropanexylenediisocyanate(TAKENATE D110N manufactured by Mitsui Takeda Chemicals, inc) and 0.2 part of a silane coupling agent (manufactured by Soken Chemical & Engineering Co., Ltd. with a trade name of A-100, which is acetoacetyl group containing silane coupling agent) relative to 100 parts of a solid matter of the acrylic-based polymer solution.

(Fabrication of Pressure Sensitive Adhesion Type Optical Film)

A pressure sensitive adhesive layer with a thickness of 20 μm was obtained by coating the pressure sensitive adhesive on a separator constituted of a polyester film surface treated with a solicone-based release agent to heat a coat at 150° C. for 5 min. The pressure sensitive adhesive layer was transferred onto one surface of a polarizing plate A from the separator on which the pressure sensitive adhesive layer was formed to thereby fabricate a pressure sensitive adhesion type polarizing plate.

Comparative Example 2

(Preparation of Pressure Sensitive Adhesive)

An acrylic-based pressure sensitive adhesive was obtained in a similar way to that in Example 1, with the exception that in Example 1, mixed were 0.01 part of dibenzoyl peroxide (manufactured by NOF Corporation. with a trade name of Nyper BO-Y) and 0.06 part of trimethylolpropanexylenediisocyanate(TAKENATE D110N manufactured by Mitsui Takeda Chemicals, inc) and 0.2 part of a silane coupling agent (manufactured by Soken Chemical & Engineering Co., Ltd. with a trade name of A-100, which is acetoacetyl group containing silane coupling agent) relative to 100 parts of a solid matter of the acrylic-based polymer solution.

(Fabrication of Pressure Sensitive Adhesion Type Optical Film)

A pressure sensitive adhesive layer with a thickness of 20 μm was obtained by coating the pressure sensitive adhesive on a separator constituted of a polyester film surface treated with a solicone-based release agent to heat a coat at 150° C. for 5 min. The pressure sensitive adhesive layer was transferred onto one surface of a polarizing plate A from the separator on which the pressure sensitive adhesive layer was formed to thereby fabricate a pressure sensitive adhesion type polarizing plate.

Comparative Example 3

(Preparation of Pressure Sensitive Adhesive)

An acrylic-based pressure sensitive adhesive was obtained in a similar way to that in Example 1, with the exception that in Example 1, mixed were 3.0 parts of dibenzoyl peroxide (manufactured by NOF Corporation. with a trade name of Nyper BO-Y) and 0.02 part of trimethylolpropanexylenediisocyanate(TAKENATE D110N manufactured by Mitsui Takeda Chemicals, inc) and 0.2 part of a silane coupling agent (manufactured by Soken Chemical & Engineering Co., Ltd. with a trade name of A-100, which is acetoacetyl group containing silane coupling agent) relative to 100 parts of a solid matter of the acrylic-based polymer solution.

(Fabrication of Pressure Sensitive Adhesion Type Optical Film)

A pressure sensitive adhesive layer with a thickness of 20 μm was obtained by coating the pressure sensitive adhesive on a separator constituted of a polyester film surface treated with a solicone-based release agent to heat a coat at 150° C. for 5 min. The pressure sensitive adhesive layer was transferred onto one surface of a polarizing plate A from the separator on which the pressure sensitive adhesive layer was formed to thereby fabricate a pressure sensitive adhesion type polarizing plate.

Comparative Example 4

(Preparation of Pressure Sensitive Adhesive)

An acrylic-based polymer solution with a weight average molecular weight of 1,700,000 (at a solid matter concentration of 30%) was obtained in a similar way to that in Example 1 with the exception that in Example 1, 1.0 part of acrylic acid was used instead of 1.0 part of 4-hydroxybutyl acrylate. Note that an acrylic-based pressure sensitive adhesive was obtained by mixing 0.02 part of trimethylolpropanexylenediisocyanate(TAKENATE D110N manufactured by Mitsui Takeda Chemicals, inc) and 0.1 part of a silane coupling agent (3-glycidoxypropyltrimethoxysilane) relative to 100 parts of a solid matter of the acrylic-based polymer solution.

(Fabrication of Pressure Sensitive Adhesion Type Optical Film)

A pressure sensitive adhesive layer with a thickness of 20 μm was obtained by coating the pressure sensitive adhesive on a separator constituted of a polyester film surface treated with a solicone-based release agent to heat a coat at 150° C. for 5 min. The pressure sensitive adhesive layer was transferred onto one surface of a polarizing plate A from the separator on which the pressure sensitive adhesive layer was formed to thereby fabricate a pressure sensitive adhesion type polarizing plate.

Comparative Example 5

(Preparation of Pressure Sensitive Adhesive)

An acrylic-based pressure sensitive adhesive was obtained in a similar way to that in Comparative Example 4, with the exception that in Comparative Example 4, mixed were 0.01 part of dibenzoyl peroxide (manufactured by NOF Corporation. with a trade name of Nyper BO-Y) and 3.0 parts of trimethylolpropanexylenediisocyanate(TAKENATE D110N manufactured by Mitsui Takeda Chemicals, inc) relative to 100 parts of a solid matter of the acrylic-based polymer solution.

(Fabrication of Pressure Sensitive Adhesion Type Optical Film)

A pressure sensitive adhesive layer with a thickness of 20 μm was obtained by coating the pressure sensitive adhesive on a separator constituted of a polyester film surface treated with a solicone-based release agent to heat a coat at 150° C. for 5 min. The pressure sensitive adhesive layer was transferred onto one surface of a polarizing plate A from the separator on which the pressure sensitive adhesive layer was formed to thereby fabricate a pressure sensitive adhesion type polarizing plate.

Comparative Example 6

(Preparation of Pressure Sensitive Adhesive)

An acrylic-based pressure sensitive adhesive was obtained in a similar way to that in Comparative Example 4, with the exception that in Comparative Example 4, mixed were 3.0 parts of dibenzoyl peroxide (manufactured by NOF Corporation. with a trade name of Nyper BO-Y) and 0.005 part of trimethylolpropanexylenediisocyanate(TAKENATE D110N manufactured by Mitsui Takeda Chemicals, inc) relative to 100 parts of a solid matter of the acrylic-based polymer solution.

(Fabrication of Pressure Sensitive Adhesion Type Optical Film)

A pressure sensitive adhesive layer with a thickness of 20 μm was obtained by coating the pressure sensitive adhesive on a separator constituted of a polyester film surface treated with a solicone-based release agent to heat a coat at 150° C. for 5 min. The pressure sensitive adhesive layer was transferred onto one surface of a polarizing plate A from the separator on which the pressure sensitive adhesive layer was formed to thereby fabricate a pressure sensitive adhesion type polarizing plate.

Evaluation described below was conducted on pressure sensitive adhesion type optical film having been obtained in the examples and the comparative examples. In table 1, there are shown the results.

<Bowing>

The pressure sensitive adhesion type polarizing plates (each was of a size of 360 mm in length×360 mm in width) having been obtained in the examples and the comparative examples each were adhered on one surface of a non-alkali glass plate with a thickness of 0.07 mm. Then, the composites were treated in an autoclave at 50° C. under 5 atm for 15 min so as to realize a perfect adherence. The samples each were subjected to a first treatment in conditions of 80° C. and 48 hr, and a second treatment in conditions of 60° C., 90% RH and 48 hr, thereafter, placed on a horizontal table without depressions or protrusions in an atmosphere at 23° C. and 55% RH and a bowing was measured on each sample at 4 points on a surface thereof with a clearance gauge. Bowings obtained at the 4 points were averaged to obtain a representative which is also referred to a bowing. Evaluation criteria are as follows:

◯: a bowing of a glass plate is less than 0.5 mm.

▲: a bowing of a glass plate is in the range of from 0.5 to 1.0 mm.

x: a bowing of a glass plate exceeds 1.0 mm.

<Light Leakiness>

The pressure sensitive adhesion type polarizing plates (each size was 420 mm in length and 320 mm in width) having been obtained in the examples and the comparative examples each were adhered on both surfaces of each non-alkali glass plate with a thickness of 0.07 mm so as to be in the cross- Nichols relation. Then, the composites were treated in an autoclave at 50° C. under 5 atm for 15 min so as to realize a perfect adherence. After the samples were treated in conditions of 100° C., 90% RH and 500 hr and conditions of 60° C., 90% RH and 500 hr, the samples were placed on a backlight with 10,000 cd and light leakiness was visually observed with evaluation criteria below described.

○: no problem in practical use

▲: at a level of almost no problem in practical use, but slightly insufficient under visual observation x: problematic in practical use <Durability>

The pressure sensitive adhesion type polarizing plates (each size was 420 mm in length and 320 mm in width) having been obtained in the examples and the comparative examples each were adhered on both surfaces of each non-alkali glass plate with a thickness of 0.07 mm so as to be in the cross-Nichols relation. Then, the composites were treated in an autoclave at 50° C. under 5 atm for 15 min so as to realize a perfect adherence. After the samples were treated in conditions of 100° C., and 500 hr, 110° C., and 500 hr, 60° C., 90% RH and 500 hr, and 80° C., 90% RH and 500 hr, respectively, the samples were visually observed as to foaming, peeling off and film lifting with evaluation criteria described below.

○: any of foaming, peeling off and film lifting is observed.

▲: at a level of almost no problem in practical use, but slightly insufficient under visual observation x: problematic in practical use <Adhesive Deficiency>

The pressure sensitive adhesion type polarizing plates having been obtained in the examples and the comparative examples each were punched in to squares with a side of 270 mm in length with one square sample from each polarizing plate and adhesive deficiency at an edge was evaluated with evaluation criteria described below:

○: a depth of adhesive deficiency from an edge is less than 100 μm

▲: a depth of adhesive deficiency from an edge is in the range of from 100 to less than 300 μm x: a depth of adhesive deficiency from an edge is equal to or more than 300 μm <Punching Property>

The pressure sensitive adhesion type polarizing plates having been obtained in the examples and the comparative examples were punched in to squares with a side of 270 mm in length with 100 pieces from each polarizing plate, a worker observed on the pieces with an naked eye and touch feeling to confirm the presence or absence of pressure sensitive adhesion feeling on side faces of the polarizing plates. Besides, in a case where a surface of a polarizing plate was contaminated, the state was determined to be adhesive contamination. Evaluation criteria were as follows:

○: none of 100 pieces observed is determined to be adhesive contamination.

▲: 1 to 5 of 100 pieces observed are determined to be adhesive contamination.

x: 6 or more of 100 pieces observed are determined to be adhesive contamination.

TABLE 1

| | | | Examples | | | | | | | |
|---|---|---|---|---|---|---|---|---|---|---|
| | | | 1 | 2 | 3 | 4 | 5 | 6 | 7 | 8 |
| (Meth)acrylic-based polymer (A) | (a1) | Kind | BA | BA | BA | BA | EA | BA | BA | BA |
| | | Use quantity | 99 | 99 | 99 | 99 | 99 | 99 | 99 | 98 |
| | (a2) or the like | Kind | 4HBA | 4HBA | 4HBA | 4HBA | 4HBA | 4HBA | 4HBA | 4HBA |
| | | Use quantity | 1 | 1 | 1 | 1 | 1 | 1 | 1 | 2 |
| Use quantity of peroxide (B) | | | 0.15 | 0.15 | 0.15 | 0.1 | 0.15 | 0.15 | 0.15 | 0.3 |
| Use quantity of isocyanate-based compound (C) | | | 0.02 | 0.02 | 0.08 | 0.035 | 0.02 | 0.02 | 0.02 | 0.02 |
| Use quantity of silane coupling agent | | | 0.2 | 0.2 | 0.2 | 0.2 | 0.2 | 0.2 | 0.2 | 0.1 |
| Presence of anchor coat layer | | | No | Yes | No | No | No | No | Yes | No |
| Kind of polarizing plate | | | A | A | A | A | A | B | B | A |
| Bowing | 80° C. × 48 hr | | ○ | ○ | ○ | ○ | ○ | ○ | ○ | ○ |
| | 60° C., 90% RH × 48 hr | | ○ | ○ | ○ | ○ | ○ | ○ | ○ | ○ |
| Light leakness | 100° C. × 500 hr | | ○ | ○ | ○ | ○ | ○ | ○ | ○ | ○ |
| | 60° C., 90% RH × 500 hr | | ○ | ○ | ○ | ○ | ○ | ○ | ○ | ○ |
| Durability | 100° C. × 500 hr | | ○ | ○ | ○ | ○ | ○ | ○ | ○ | ○ |
| | 110° C. × 500 hr | | ○ | ○ | ○ | ○ | ○ | ○ | ○ | ○ |
| | 60° C., 90% RH × 500 hr | | ○ | ○ | ○ | ○ | ○ | ○ | ○ | ○ |
| | 80° C., 90% RH × 500 hr | | ○ | ○ | ○ | ○ | ○ | ○ | ○ | ○ |
| Adhesive deficiency | | | ○ | ○ | ○ | ○ | ○ | ○ | ○ | ○ |
| Punching property | Pressure sensitive adhesion feeling on side face | | ○ | ○ | ○ | ○○ | ○ | ○ | ○ | ○ |
| | Adhesive contamination | | ○ | ○ | ○ | ○ | ○ | ○ | ○ | ○ |

| | | | Examples | | Comparative examples | | | | | |
|---|---|---|---|---|---|---|---|---|---|---|
| | | | 9 | 10 | 1 | 2 | 3 | 4 | 5 | 6 |
| (Meth)acrylic-based polymer (A) | (a1) | Kind | BA | BA | BA | BA | BA | BA | BA | BA |
| | | Use quantity | 99 | 99 | 99 | 99 | 99 | 99 | 99 | 99 |
| | (a2) or the like | Kind | 4HBA | 2HEA | 4HBA | 4HBA | 4HBA | AA | AA | AA |
| | | Use quantity | 1 | 1 | 1 | 1 | 1 | 1 | 1 | 1 |
| Use quantity of peroxide (B) | | | 0.04 | 0.15 | — | 0.01 | 3.0 | — | 0.01 | 3 |
| Use quantity of isocyanate-based compound (C) | | | 0.005 | 0.02 | 0.07 | 0.06 | 0.02 | 0.02 | 3 | 0.005 |
| Use quantity of silane coupling agent | | | 0.2 | 0.2 | 0.2 | 0.2 | 0.2 | 0.1 | — | — |
| Presence of anchor coat layer | | | Yes | No | No | No | No | No | No | No |
| Kind of polarizing plate | | | C | A | A | A | A | A | A | A |

TABLE 1-continued

| | | | | | | | | | |
|---|---|---|---|---|---|---|---|---|---|
| Bowing | 80° C. × 48 hr | o | o | o | o | x | o | x | x |
| | 60° C., 90% RH × 48 hr | o | o | o | o | x | o | x | x |
| Light leakness | 100° C. × 500 hr | o | o | o | o | x | o | x | x |
| | 60° C., 90% RH × 500 hr | o | o | o | o | x | o | x | x |
| Durability | 100° C. × 500 hr | o | o | o | o | o | x | o | o |
| | 110° C. × 500 hr | o | ▲ | x | o | o | x | x | o |
| | 60° C., 90% RH × 500 hr | o | o | o | o | o | o | o | x |
| | 80° C., 90% RH × 500 hr | o | o | x | o | o | x | x | x |
| Adhesive deficiency | | o | o | o | o | o | ▲ | o | x |
| Punching property | Pressure sensitive adhesion feeling on side face | o | o | x | x | o | x | ▲ | o |
| | Adhesive contamination | o | o | x | x | o | x | x | o |

In Table 1, BA means butyl acrylate, EA means ethyl acrylate, 4HBA means 4-hydroxybutyl acrylate, 2HEA means 2-hydroxyethyl acrylate and AA means acrylic acid.

What is claimed is:

1. A pressure sensitive adhesive for an optical film comprising: 100 parts by weight of a (meth)acrylic-based polymer (A) including an alkyl (meth)acrylate (a1) and a (meth)acrylic-based monomer containing a hydroxyl group (a2), as a copolymerizable component, in content in the range of from 0.01 to 5 parts by weight relative to 100 parts by weight of the alkyl (meth)acrylate (a1); 0.02 to 2 parts by weight of a peroxide (B); and 0.001 to 2 parts by weight of an isocyanate-based compound (C), the contents of the peroxide (B) and the isocyanate-based compound (C) being values relative to 100 parts by weight of the (meth)acrylic-based polymer (A).

2. The pressure sensitive adhesive for an optical film according to claim 1 further comprising a silane coupling agent.

3. A manufacturing method for a pressure sensitive adhesive layer for an optical film in which the pressure sensitive adhesive layer is formed by causing a cross-linking reaction in a pressure sensitive adhesive for an optical film according to claim 1.

4. A pressure sensitive adhesive layer for an optical film constituted of a pressure sensitive adhesive layer formed by means of the manufacturing method according to claim 3.

5. A manufacturing method for a pressure sensitive adhesive layer for an optical film in which the pressure sensitive adhesive layer is formed by causing a cross-linking reaction in a pressure sensitive adhesive for an optical film according to claim 2.

6. A pressure sensitive adhesive layer for an optical film constituted of a pressure sensitive adhesive layer formed by means of the manufacturing method according to claim 5.

7. A pressure sensitive adhesive for an optical film comprising:
100 parts by weight of a (meth)acrylic-based polymer (A) including an alkyl (meth)acrylate (a1) and a (meth)acrylic-based monomer containing a hydroxyl group (a2), as a copolymerizable component, wherein a weight ratio of the hydroxyl group (a2) to the alkyl (meth)acrylate (a1) is 0.01/100 to 5/100;
0.02 to 2 parts by weight of a peroxide (B); and
0.001 to 2 parts by weight of an isocyanate-based compound (C),
said (meth)acrylic-based polymer (A), said peroxide (B), and said isocyanate-based compound (C) being cross-linked by a thermal decomposition cross-linking reaction of the peroxide (B) and using a urethane bond formed between the isocyanate-based compound (C) and a hydroxyl group present by the monomer (a2).

8. The pressure sensitive adhesive for an optical film according to claim 7, further comprising 1 part by weight or less of a silane coupling agent relative to 100 parts by weight of the (meth)acrylic-based polymer (A).

* * * * *

UNITED STATES PATENT AND TRADEMARK OFFICE
CERTIFICATE OF CORRECTION

PATENT NO. : 7,435,779 B2
APPLICATION NO. : 11/290165
DATED : October 14, 2008
INVENTOR(S) : Yuusuke Toyama et al.

It is certified that error appears in the above-identified patent and that said Letters Patent is hereby corrected as shown below:

On Page 1, at Column 2, Line 2, Item (56), under Foreign Patent Documents, above "JP 8-199131 A * 8/1996" please delete "JP 8-199131 8/1996".

On Page 1, at Column 2, Line 17, Item (56), under Foreign Patent Documents, below "JP 2003-41229 * A 2/2003" please delete "JP 2003-49141 A 2/2003".

At Column 4, Line 31, please delete "alkylen" and insert --alkylene--, therefor.

At Column 4, Line 34, please delete "alkylen" and insert --alkylene--, therefor.

At Column 4, Line 40, please delete "alkylen" and insert --alkylene--, therefor.

At Column 7, Line 44, please delete "hydrophillic" and insert --hydrophilic--, therefor.

At Column 8, Line 31, please delete "allyamine" and insert --allylamine--, therefor.

At Column 8, Line 61, please delete "poly-ene" and insert --polyene--, therefor.

At Column 11, Line 7, please delete "laminatd" and insert --laminated--, therefor.

At Column 17, Line 24, please delete "characterisitic" and insert --characteristic--, therefor.

At Column 20, Line 30 (approximately), please delete "solicone-based" and insert --silicone-based--, therefor.

UNITED STATES PATENT AND TRADEMARK OFFICE
CERTIFICATE OF CORRECTION

PATENT NO.         : 7,435,779 B2
APPLICATION NO. : 11/290165
DATED                   : October 14, 2008
INVENTOR(S)         : Yuusuke Toyama et al.

It is certified that error appears in the above-identified patent and that said Letters Patent is hereby corrected as shown below:

At Column 20, Line 46 (approximately), please delete "polarzing" and insert --polarizing--, therefor.

At Column 20, Line 56 (approximately), please delete "solicone-based" and insert --silicone-based--, therefor.

At Column 21, Line 14 (approximately), please delete "solicone-based" and insert --silicone-based--, therefor.

At Column 22, Line 40 (approximately), please delete "polarzing" and insert --polarizing--, therefor.

At Column 27, Line 23, please delete "below." and insert --below:--, therefor.

At Column 28, Line 21, in Table 1, please delete "°°" and insert --°--.

Signed and Sealed this

Twenty-second Day of December, 2009

David J. Kappos
*Director of the United States Patent and Trademark Office*